United States Patent [19]

Everett

[11] Patent Number: 5,487,819

[45] Date of Patent: Jan. 30, 1996

[54] PRODUCTION OF METALS FROM MINERALS

[76] Inventor: Peter K. Everett, 2 Linden Way, Castlecrag NSW 2068, Australia

[21] Appl. No.: 360,695

[22] PCT Filed: Jun. 25, 1993

[86] PCT No.: PCT/AU93/00311

§ 371 Date: Dec. 23, 1994

§ 102(e) Date: Dec. 23, 1994

[87] PCT Pub. No.: WO94/00606

PCT Pub. Date: Jan. 6, 1994

[30] Foreign Application Priority Data

Jun. 26, 1992 [AU] Australia ................... PL3172

[51] Int. Cl.$^6$ ................................................ C25C 1/12
[52] U.S. Cl. ................... 205/347; 205/559; 205/560; 205/562; 205/563; 205/570; 205/575; 205/576; 205/582; 205/584; 205/586; 205/591; 205/592; 205/600; 205/606
[58] Field of Search .................. 204/106, 107, 204/113, 114, 117, 118, 126, 205 R; 423/38

[56] References Cited

U.S. PATENT DOCUMENTS

| 4,111,688 | 9/1978 | Ichijo | 75/714 |
| 4,148,698 | 4/1979 | Everett | 204/118 |
| 4,337,128 | 6/1982 | Haakonsen | 204/107 |
| 4,551,213 | 11/1985 | Wilson | 75/736 |
| 4,671,945 | 6/1987 | Thomassen | 423/27 |
| 5,045,160 | 9/1991 | Hanulik | 204/105 R |

FOREIGN PATENT DOCUMENTS 8332 of 1888 United Kingdom.

*Primary Examiner*—John Niebling
*Assistant Examiner*—Brendan Mee
*Attorney, Agent, or Firm*—Kelly, Bauersfeld & Lowry

[57] ABSTRACT

A process for producing one or more metals from a mineral feedstock (12) is defined. The mineral is fed to a leaching apparatus (10) wherein it is contacted with electrolyte (14). The leaching apparatus has zones of decreasing oxidation potential (17, 18, 19, 20) respectively. A stream of electrolyte (14A) is removed from zone (20) and is treated to remove impurities and unwanted metals in treatment unit (25A), prior to metal recovery by electrolysis. The electrolyte after electrolysis is then returned to the leaching unit (10). A second electrolyte stream (14B) may be removed from zone (19) for recovery of additional metals. The electrolyte (14B) is treated to remove impurities and any unwanted metals in treatment unit (25B), prior to metal recovery by electrolysis. The electrolyte after electrolysis is returned to leaching unit (10). The process enables the leaching of difficult to leach minerals, including gold, and can produce one or more metals of high purity.

47 Claims, 4 Drawing Sheets

PRODUCTION OF METALS FROM MINERALS

This application claims benefit of PCT/AU 93/00311 under 35 U.S.C. 371.

TECHNICAL FIELD

The present invention relates to the production of metals from minerals, and more particularly to the production of base and precious metals from ores and concentrates, including the production of copper. The invention will in part be hereinafter described with reference to the treatment of sulfur containing ores, however, it is to be appreciated that the invention is not limited to this type of use. When the terms "mineral" or "minerals" are used in the present specification they are intended to include any metal-containing compound including ores, concentrates, semi-refined metal compounds, metal oxides and sulfides, flue dust etc.

BACKGROUND ART

Processes are known for the treatment of minerals containing one or two metals of particular interest for removal of the metal(s). These processes become extremely costly and complex to operate when treating minerals having complex compositions. Furthermore the attaining of product purity is also more difficult when the mineral has a complex composition or contains many contaminants.

A major problem today (and in the future) relates to the disposal of waste and by-products resulting from the existing treatment of minerals for metal recovery. For sulfur containing minerals, this problem is exacerbated in that a typical by-product is sulfur either in the form of sulfur dioxide gas or sulfuric acid. Enormous atmospheric emission problems stem from the production of sulfur dioxide (including acid rain) and it has been usual to reclaim sulfur dioxide by producing sulfuric acid. However, sulfuric acid is so prevalent that many producers have actually been required to incur cost for its removal from site.

Given the problems of the high level of waste and by-products from the treatment of minerals, and more particularly to the by-production of sulfur dioxide/sulfuric acid, attempts have been made to develop processes wherein the disposal and/or reclaiming of by-products is simplified.

U.S. Pat. No. 3,673,061 to Cyprus Metallurgical Process Corporation describes the oxidation of copper sulfides in a slurry at the anode of an electro-chemical cell, with the requirement for an anode current density of at least 12 amps per square foot for decomposition of the copper sulfide. The presence of iron in many minerals results in a low anode current efficiency for copper in this process due to power consumed by iron oxidation. The electrolytic production of iron in this process is very expensive and renders the process uneconomic both in terms of efficiency and overall cost.

Australian patent application number 46913/72 to the Duval Corporation describes a process involving the ferric chloride and cupric chloride leaching of copper sulfide ores. The process is quite complex and requires temperatures of around 140° C., and pure oxygen at pressures of up to 3.5 atmospheres.

U.S. Pat. No. 4,061,552 to Dextec Metallurgical Pty Ltd overcomes the disadvantages of relatively high operating temperatures and pressures by electrolysing copper sulfides in the anode compartment of an electrolytic cell, with the simultaneous addition of air to precipitate iron. However, it is difficult to produce a pure product from the Dextec process.

Another existing process is the Cuprex Process. The Cuprex process involves leaching a copper concentrate with ferric chloride solution, solvent extraction of the ferric chloride solution, scrubbing, stripping and then electrolysis to produce copper. The Cuprex process is an expensive process, having a high power consumption, high capital and operating costs and is overall a complex procedure to operate. Furthermore, products such as gold must be removed using existing methods which have undesirable side effects.

It would be advantageous if at least preferred forms of the present invention ameliorated the deficiencies of the prior art or, at the very least, provided an effective alternative to prior art processes.

DISCLOSURE OF THE INVENTION

In a first aspect the present invention provides a process for producing one or more metals from a mineral containing the same, wherein the mineral is transferred to a leaching process comprising a high oxidation potential zone (hop zone) and a low oxidation potential zone (lop zone) and through which an electrolyte of acid pH is passed from the hop zone to the lop zone, comprising the steps of:

(i) feeding the mineral to the lop zone to contact the electrolyte whereby at least some of the or each metal is leached from the mineral, with at least some of the or each metal that is leached being in a low oxidation valence state;

(ii) electrolysing the electrolyte that leaves the lop zone in an electrolysis process to produce the one or more metal(s) and to increase the oxidation potential of the electrolyte that leaves the electrolysis process;

(iii) returning the electrolyte of increased oxidation potential to the hop zone of the leaching process; and (iv) reducing the oxidation potential of the electrolyte as it is passed through the hop zone to the lop zone to its level prior to electrolysis.

The process of the present invention by separating the electrolysis process from the leaching process enables the employment of a number of advantageous preferred steps as detailed below.

It is preferred that the oxidation potential of the electrolyte is reduced by countercurrent contacting the electrolyte with an oxidisable substance as the electrolyte is passed from the hop zone to the lop zone. Preferably the oxidisable substance is the mineral and the electrolyte is in continuous contact with the mineral as the mineral is passed from the lop zone to the hop zone to substantially leach the or each metal from the mineral.

It is preferred that the electrolyte includes two or more halides, and the increase in oxidation potential of the electrolyte is brought about by forming one or more halide complexes which cause further leaching of the one or more metals from the mineral as it passes through the hop zone.

When the term "halide complex" is used in the present specification, it is intended to include species formed from the combination of two or more halides including $F^-$, $Cl^-$, $Br^-$ and $I^-$. For example, a halide complex commonly formed in the preferred process of the invention is $BrCl_2^-$.

The employment of halide complexes imparts a number of distinct advantages to the most preferred forms of the present invention, which previously have not been achieved by prior art processes. It is known to store anodic energy by, for example, the oxidation of ferrous iron or cuprous copper to ferric and cupric ion respectively, or by the oxidation of chloride solution to produce chlorine gas, in the anode compartment of an electrolysis cell. These three forms of storage each have disadvantages, with ferric and cupric ion anodic energy storage producing ferric and cupric ion which may contaminate a metal product in electrolysis processes, and with chlorine gas anodic energy storage necessitating the storage of large volumes of chlorine gas. However, formation of the halide complex enables the storage of anodic energy in a soluble form which will not contaminate a metal product and enables the control of return anolyte at a high oxidation potential which can be used for the leaching of other specific metals, eg precious metals, in the mineral.

Preferably the electrolyte includes chloride and dissolved copper which is substantially in the cupric state as the electrolyte enters the hop zone and is substantially in the cuprous state when electrolyte is drawn from the leaching process for metal production.

Copper functions as a catalyst in the preferred processes of the present invention. It catalyses various reactions in the leaching process, including the halide complex oxidation of the mineral, and the air oxidation and lead leaching reactions (detailed below).

It is preferred that the hop zone comprises a halide complex leaching zone (hcl zone) into which electrolyte returning from the electrolysis process is passed and in which final leaching of the mineral takes place before it is removed from the leaching process, and an aeration zone through which electrolyte from the hcl zone is passed and aerated and through which partially leached mineral from the lop zone is passed for further leaching before transfer to the hcl zone, the aeration precipitating leached iron when present in the mineral and/or oxidising at least some of any cuprous copper present in the aeration zone to cupric copper.

Preferably the electrolyte is treated after leaving the lop zone and prior to entering the electrolysis process, the treatment process comprising removing any impurities in the electrolyte and/or removing certain metals which may contaminate the or each metal produced in the electrolysis process. Certain metal(s) can be removed by a silver removal process as defined below, together with a pH raising process as defined below.

Preferably the one or more metals are produced in one or more electrolysis cells, with the or each cell including a membrane which separates a cathode from an anode. Catholyte is then formed at the cathode side of the cell and anolyte at the anode side of the cell. Preferably the membrane is non-porous and it is most preferred that the membrane is as per the eighth aspect of the invention as defined below.

In one preferred form of the invention the electrolysis process is conducted with a plurality of cells arranged in series with catholyte from a given cell being transferred to a cathode compartment of a subsequent cell. Anolyte can be transferred through the cell series in either a cocurrent or countercurrent direction with respect to the catholyte.

Preferably Ni, Pb and Zn are produced in the series cell arrangements, when these metals are present in the mineral fed to the process.

Preferably the lop zone comprises a dissolved copper zone (dc zone) wherein at least a portion of the copper is in a solubilised form, and a copper precipitation zone (cp zone) wherein at least a portion of any dissolved copper in the electrolyte is precipitated therefrom to mix with any mineral that has been fed to the leaching process in the cp zone, the resultant mixture then being countercurrently transferred through the leaching process, with electrolyte from the hop zone passing firstly through the dc zone and then through the cp zone and with mineral being fed to the leaching process to either or both of the dc and cp zones.

Preferably copper may be produced in at least one copper electrolysis cell as part of the electrolysis process, and preferably this cell is in parallel to the series of electrolysis cells. Preferably the electrolyte for the copper electrolysis cell is taken from the dc zone.

Also disclosed herein is a treatment process for substantially removing silver from a cuprous chloride electrolyte comprising the steps of:

passing the electrolyte to an electrolysis cell having a cathode and a copper anode;

adding soluble mercury to the electrolyte in the cell;

electrolysing the resultant solution to form a Cu/Hg/Ag amalgam on the cathode.

Also disclosed herein is a treatment process for substantially removing certain metal(s) from a cuprous chloride electrolyte having a pH of generally less than 3.5 comprising the steps of:

increasing the pH of the electrolyte up to a value ranging from approximately 6 to 6.5 or to a value just prior to cuprous copper precipitation, in stepwise increases of one or more predetermined pH ranges between pH, 3.5 and said value, each pH range corresponding to a point at which one or more of the certain metal(s) precipitate from the electrolyte; and removing the precipitate of the one or more certain metal(s) at each pH range from the electrolyte.

These treatment processes are preferably the treatment processes referred to above for removing certain metal(s) which may contaminate the or each metal produced in any of the electrolysis cells.

Preferably the electrolyte leaches any gold present in the mineral fed to the leaching process, wherein a portion of the electrolyte in the hop zone is removed and passed to a gold recovery process.

In a second aspect the present invention provides a countercurrent leaching process for leaching one or more metals from a mineral containing the same, the process comprising a high oxidation potential zone (hop zone) and a low oxidation potential zone (lop zone) whereby an electrolyte of high oxidation potential and acid pH is fed to the hop zone and the mineral is fed to the lop zone, comprising the steps of:

(1) passing the electrolyte from the hop zone to the lop zone and transferring the mineral from the lop zone to the hop zone in a counter-current direction to electrolyte flow, the electrolyte being kept in continuous contact with the mineral to leach at least some of the one or more metals therefrom thereby lowering its oxidation potential;

(2) removing the electrolyte from the lop zone with the one or more metals therein and removing a partially or substantially leached mineral from the lop zone;

wherein the electrolyte fed to the hop zone includes one or more halide complexes as herein defined.

Also disclosed herein is apparatus that is used in a process as defined in the first aspect of the invention comprising:

one or more vessels adapted for receiving the mineral and the electrolyte so that the electrolyte is brought into contact with the mineral to leach the one or more metals from the mineral; and one or more electrolysis cells, each adapted for receiving mineral contacted electrolyte from the vessel(s), for producing a respective one or more of the metals from the metal(s) leached into the electrolyte and for returning the electrolyte to the vessel(s).

Preferably the apparatus additionally comprises an electrolyte treatment means arranged between the vessel(s) and the electrolysis cell(s) for removing any impurities in the electrolyte and/or certain metals which may contaminate the or each metal produced in the electrolysis process, prior to feeding the electrolyte to the electrolysis cell(s).

Preferably one or more of the vessels are adapted for feeding air therein for oxidation leaching of the mineral, with the adaptation preferably including an impeller means adapted for stirring mineral in the or each vessel.

Preferably the or each electrolysis cell is divided into a cathode compartment comprising one or more cathodes and an anode compartment comprising one or more anodes, the or each cell being divided by a membrane which is either porous or non-porous.

Also disclosed herein is an impeller comprising a hollow shaft having one end adapted for turning by motive means, and an opposite remote end, the impeller being adapted for use in the or each vessel, the remote end of the impeller having a transverse plate arranged thereon, with a plurality of blades mounted to the plate so as to extend laterally and radially outwards from the shaft at or adjacent the remote end, in use, air or oxygen being fed through the shaft to exit the impeller at the remote end.

In a third aspect the invention provides a cathode suitable for use in an electrolysis cell, the cathode being formed from a conductive material and having a plurality of isolated exposed conductive material sites for the formation thereon of the one or more metals during an electrolysis process, with each site being isolated from all other sites by providing on the cathode insulation means to prevent the in use formation of metal on the cathode in regions between the sites, wherein the cathode is formed from a copper sheet and the sites are a plurality of dimples formed in the copper sheet, with the insulating means being an insulating substance fastened to the sheet between the dimples, leaving the dimples as protruding sites for the formation of the metal(s) thereon.

Also disclosed herein is a membrane suitable for use in an electrolysis cell, the membrane being non-porous to electrolyte flow, and in use comprising a $Na_2SiO_3$ derived gel arranged on a supporting substrate.

Preferably the electrolysis cells are arranged in series and/or in parallel with one or more further electrolysis cells.

BRIEF DESCRIPTION OF THE DRAWINGS

Notwithstanding any other forms which may fall within the scope of the invention, preferred embodiments of the present invention will now be described, by way of example only, with reference to the accompanying drawings and/or the accompanying examples, in which.

MODES FOR CARRYING OUT THE INVENTION

Figure 1:
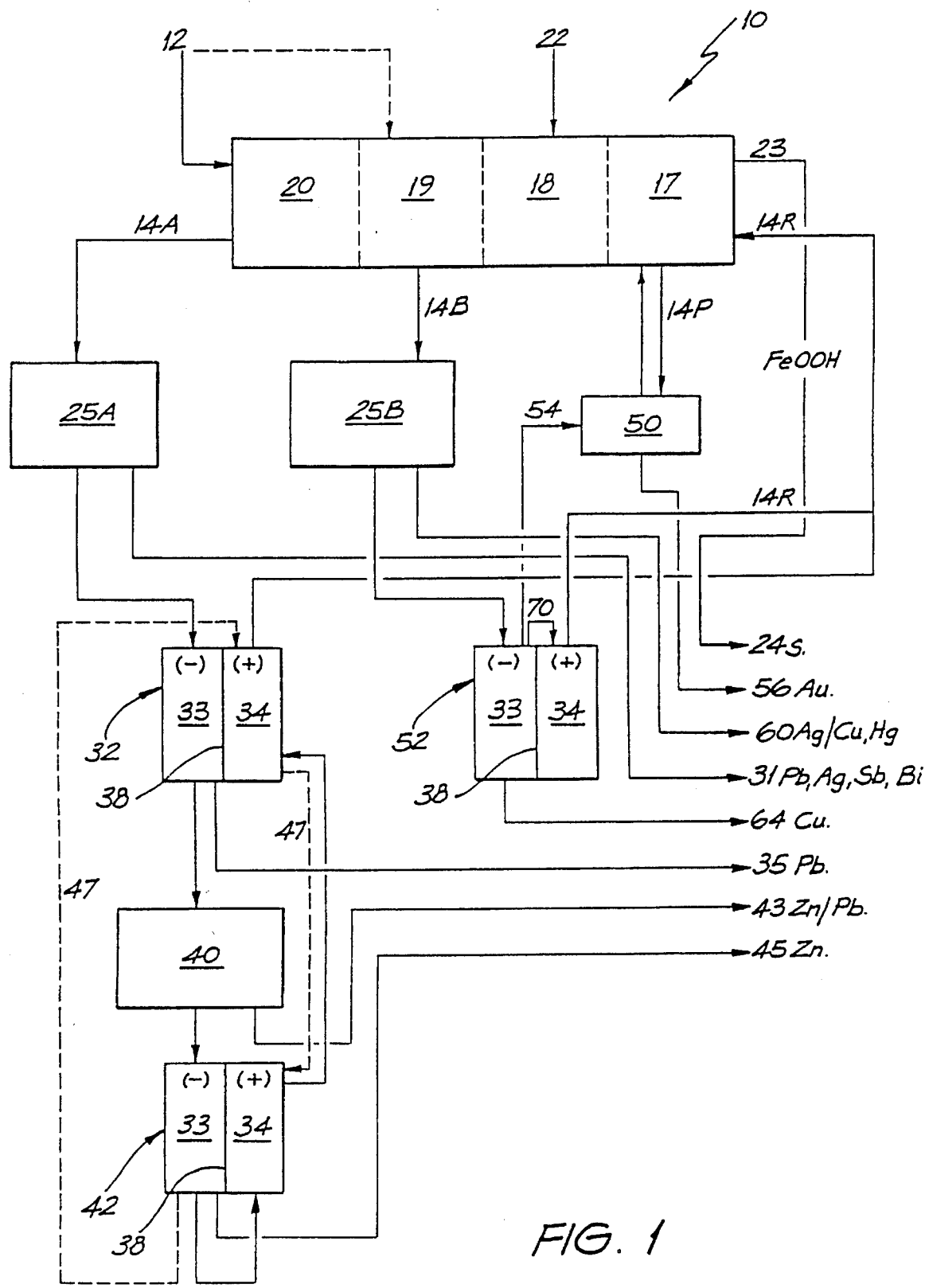
FIG. 1 depicts schematically, a process for producing one or more metals according to the invention.

Referring to FIG. 1, the process includes a countercurrent contacting unit 10 into which a mineral 12 is fed and through which an electrolyte 14 is counter currently passed to contact and leach one or more metals from the mineral.

The mineral can typically include sulfur-containing ores, such as pyrite, molybdenite, arsenopyrite, chalcopyrite, pentlandite, covellite, sphalerite, chalcocite, pyrrhotite and galena or varying compositions thereof. The electrolyte is typically a high concentration sodium chloride electrolyte of 250–300 grams per liter (gpl) of sodium chloride.

The process is capable of receiving widely varying feed stocks, including ores, concentrates, semi-purified metal containing compounds, etc. It is a particular advantage of the process that the mineral fed thereto requires far less preparation and/or purification than many existing processes.

The unit 10 is, for ease of reference, divided into four zones, hereinafter referred to as a halide complex leaching zone 17 (hcl zone), an aeration zone 18, a dissolved metal zone 19 (dm zone) and a metal precipitation zone 20 (mp zone).

Air or oxygen is fed to the aeration zone, typically through one or more impellers (as described below) to assist in leaching of the mineral.

The temperature of the electrolyte is preferably greater than 70° C. and the pH is preferably between 0.5 and 3, with the process operating at generally ambient pressure. This is particularly advantageous as previous processes have in general required higher operating temperatures and pressures. The pH of the electrolyte is generally maintained below 3.5, as above pH 3.5 there is a tendancy for copper-oxychloride, e.g. atacamite $Cu_4Cl_2(OH)_6$ to form which interferes with the recovery of copper.

The mineral 12 often includes Cu, Pb, Zn, Fe, Co, Ni, As, Sb, Bi, Hg, Ag and Au metals and platinum group metals and is fed to the mp zone (and/or the dm zone, see below) whereupon leaching with electrolyte commences. The leaching vessels employed, usually incorporate a settling chamber inside the leaching tank so that a clear liquid zone is created at a substantially higher level than the slurry zone, (formed from the mineral feed), due to differences in specific gravity. This allows the electrolyte to be transferred in countercurrent flow to the mineral slurry.

As the mineral is transferred through the unit 10, it moves into regions of gradually increasing oxidation potential so that substantial proportions of specific metals in each region are leached, enabling the targeting of specific metals by drawing off electrolyte flow at different points through the unit 10.

Once the mineral has been substantially leached, the process is conducted such that any sulfide sulfur in the incoming mineral is precipitated predominantly as elemental sulfur, (see Equations (1), (5) and (6) below). Elemental sulfur is removed from the process with sludge 23, and then may be separated by conventional techniques. The process thereby overcomes disadvantages of sulfur disposal incurred in many existing processes, because sulfur does not require reclaiming as sulfuric acid, nor is any sulfur dioxide gas produced.

Metal Recovery—First Loop

The electrolyte leaving unit 10 leaves in two streams 14A and 14B. Referring to stream 14A, the electrolyte leaves the mp zone typically containing one or more metals for recovery. In one embodiment, when the mineral fed to the process includes lead, nickel and zinc, these can be leached into the electrolyte leaving unit 10 for recovery from stream 14A. FIG. 1 shows the recovery of lead and zinc only. (Additionally, when the mineral includes copper, this may be leached into the electrolyte leaving unit 10 in stream 14B for recovery). Usually, substantially, all ionic copper that passes with the electrolyte from the dm zone to the mp zone is precipitated in zone 20 (eg see Equations 8, 9 and 10 below). Thus electrolyte 14A is substantially free of copper prior to entering treatment unit 25A.

Treatment unit 25A is configured to remove any impurities present in the electrolyte and/or any metals which may affect the purity of the metals recovered subsequently by electrolysis. Thus treatment unit 25A can include thickening and/or filtration stages for removing the impurities, prior to a variable three (3) stage treatment process, (see description below with reference to FIG. 2). Thus, treatment unit 25A can comprise one or more of three (3) distinct treatment stages, namely, stage 1 treatment 26, stage 2 treatment 28 and stage 3 particulate metal treatment 40.

Stage 1 treatment removes silver and mercury, and stage 2 treatment removes any additional metal(s) below a level so as not to interfere in the subsequent electrolysis processes and so as to produce a metal of high purity. Metals removed can include iron, arsenic, bismuth, mercury, antimony, etc. as a stream 31. The treatment processes enable the attainment of metal products of extremely high purity which have rarely been obtained with existing processes, or only with some difficulty. Furthermore, each treatment unit may include one or more of stages 1, 2 and 3 above.

When lead is produced in a first electrolysis cell 32, stage 3 treatment involves passing the electrolyte through a bed of particulate lead. After treatment, the electrolyte is transferred to the cell 32 which comprises a cathode compartment 33 and anode compartment 34. In FIG. 1, Pb is produced at the first electrolysis cell forming at one or more cathodes in the cell. Typically, the cathodes are as described below (i.e. dimpled copper sheet) and typically the product is wiped from the or each cathode with a plurality of wiper blades. Cell 32 produces a lead product 35 which is removed from the bottom of the cell.

The cell includes a non-porous membrane 38 (described below; i.e. $Na_2SiO_3$ coated membrane) which prevents the electrolyte in the cathode compartment (i.e. catholyte) from passing into the electrolyte of the anode compartment (i.e. anolyte).

The catholyte from cathode compartment 33 is further treated in second treatment unit 40. Unit 40 typically includes a Stage 3 particulate metal treatment, being treatment with a metal to be produced in second electrolysis cell 42. In FIG. 1, the particulate bed in unit 40 is particulate zinc, through which spent lead cell catholyte is passed to remove any lead remaining in the catholyte as a zinc/lead product 43. Alternatively, a lead/zinc mixture may be produced in an intermediate electrolysis cell (not shown) before passing the catholyte to the cell 42.

The second electrolysis cell also includes a cathode compartment 33 and anode compartment 34 separated by membrane 38. Zinc is produced in cell 42 and is removed from the bottom of the cell as a zinc product 45. The spent zinc cell catholyte is then fed to the anode compartment of cell 42 to form the anolyte therein.

In an alternative arrangement, as indicated by the dotted line 47, the spent zinc cell catholyte may be passed back to the anode compartment of the first electrolysis cell so that the catholyte and anolyte flow are co-current rather than countercurrent. The co- or countercurrent flow of anolyte and catholyte may be applied to an electrolysis cell series comprising three or more cells. Alternatively, depending on the mineral composition and the metal to be removed, the cells may be arranged all in parallel or some in series and some in parallel, with anolyte ultimately being returned back to the countercurrent contacting unit 10 (as described below).

It is most typical that the electrolyte has a high chloride content and has ionic copper dissolved therein. The ionic copper catalyses a number of leaching reactions in the countercurrent contacting unit 10 (described below), however, it does not participate in the production of metals in the electrolyte stream 14A leaving the metal precipitation zone. When two or more halides are present in the electrolyte stream 14A, one or more halogen complexes (hereinafter "halex") are formed. Halex is formed at the or each anode of the or each electrolysis cell by oxidising the halide species in solution to form the halex. (A typical oxidation reaction is shown in equation (15) below).

Halex has the capacity of storing large amounts of anodic energy (see FIG. 4), thereby raising the oxidation potential of return electrolyte 14R. When the anolyte from cell 32 is returned to the contacting unit 10, it results in a high oxidation potential in the hcl zone, which greatly assists in the leaching of difficult to leach metals from the mineral.

It is known to store anodic energy either by the oxidation of ferrous or cuprous to ferric and cupric ion respectively, or by the oxidation of chloride solution to produce chlorine gas, however, these three forms of anodic storage each have disadvantages (as detailed above). Formation of halex overcomes these disadvantages and enables the storage of a large amount of oxidising energy for use in the hcl zone 17.

Figure 4:
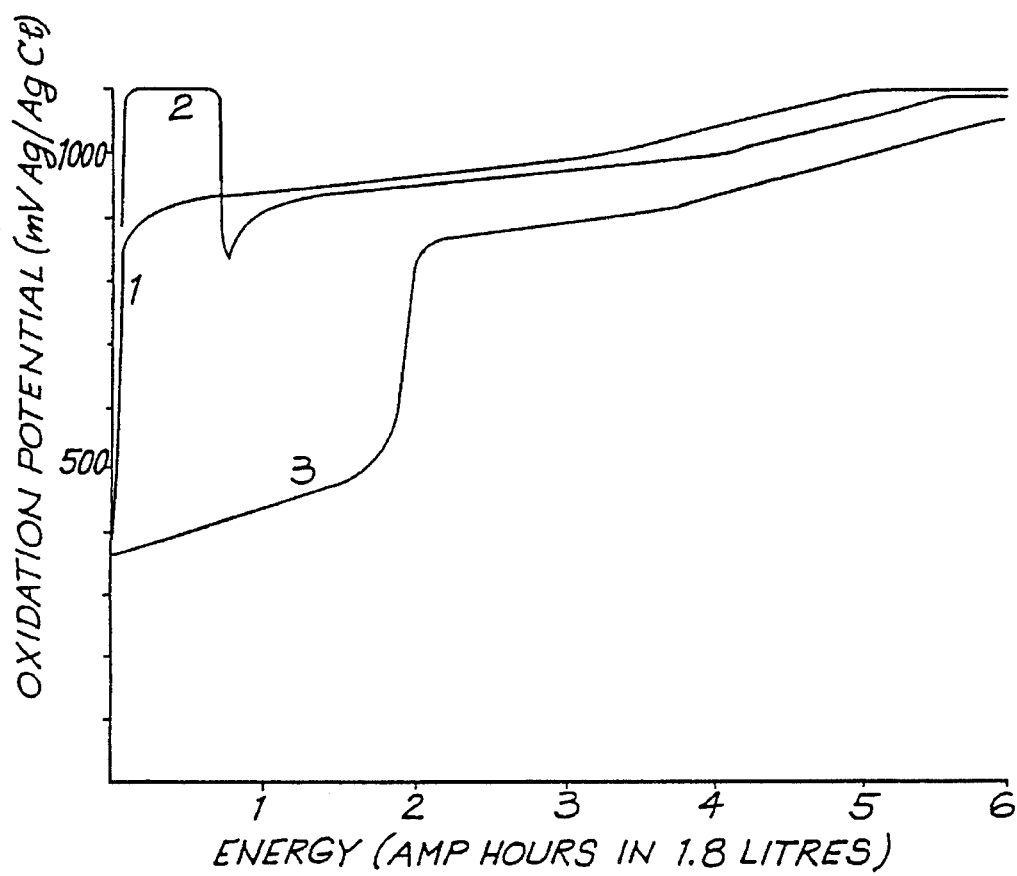
FIG. 4 shows the oxidation potential of halogen complex with increasing amounts of stored electrical energy.

FIG. 4 is a graph of oxidation potential versus electrical energy input for three different electrolytes. Curve 1 is a 280 gpl NaCl plus a 28 gpl NaBr showing the formation of $BrCl_2^-$ at a potential of +900 to +1000 mV (standard reference Ag/AgCl). Curve 1 shows the change in oxidation potential of the electrolyte with formation of $BrCl_2^-$ according to equation (15) below. The second part of the curve shows the increasing current efficiency of this reaction as the free $Br^-$ content decreases and the evolution of chlorine gas becomes a competing reaction, raising the oxidation potential.

Curve 2 shows the oxidation potential of a 280 gpl NaCl solution without $Br^-$ with immediate chlorine gas evolution followed by addition of NaBr which stops the gas evolution. Curve 3 shows the oxidation potential of 280 gpl NaCl electrolyte, +28 gpl NaBr, +12 gpl $Cu^+$. The area under the curves between +600 and +1000 mV (Ag/AgCl) represents the storable energy in soluble form which can be used for the leaching of, for example, gold and leach resistant mineral(s) in the mineral feed, such as pyrite and arsenopyrite. The anionic bromide can be considered as a bromide ion storing chlorine molecules. This shows that bromide is 1.59 times more effective on a weight basis than cupric iron with the additional advantages that a lead or zinc product electrolytically formed in the process is not contaminated and is formed at a high potential.

An advantage with using halide complexes as part of the oxidising substance in the leaching process is that halide complexes are formed at a potential lower than chlorine gas formation. Therefore, a halex containing electrolyte can be preferentially formed without the formation of any chlorine gas and the attendant problems thereof.

Countercurrent Leaching

As described above the countercurrent contacting unit is shown in FIG. 1 with four zones. When using the process for the production of copper, the metal precipitation zone 20 may be omitted. Alternatively, when copper is not produced, i.e. with no copper electrolysis recovery loop 14B it is most preferred that ionic copper is present in the electrolyte. Ionic copper assists in the catalysing of halex leaching in the hcl zone, (see equation (14)), oxidation leaching in the aeration zone 18 (and iron precipitation; see equation (12)) and mineral leaching (in particular lead leaching) in the dm zone 19 (see, for example, equations (1) and (9)). Ionic copper undergoes a number of transitions in the countercurrent leaching unit 10, however, the essential transition is from the cupric (+2) state in the hcl zone to the cuprous (+1) state in the dm zone.

The mineral 12 is fed to either or both of the mp and dm zones whereupon it comes into contact with electrolyte 14. In mp zone 20, most of the ionic copper present in the electrolyte precipitates as either a cupric or cuprous sulfide, in turn leaching mineral sulfides (as per equations (8), (9), and (10)). Metals such as lead, nickel, zinc and molybdenum are leached and/or present in the electrolyte (from upstream leaching) and pass out of unit 10 in stream 14A for subsequent recovery.

In one preferred embodiment, the mp zone may be separated from the countercurrent leaching process so that the mineral feed to unit 10 comes from eg. a settling tank intermediate the separated mp zone and the dm zone 19. The settling tank receives partially leached mineral from a separate leaching/metal recovery system. Thus, for an easily leached metal for example, the separate metal recovery system can be run simultaneously, so that the mineral fed to unit 10 is already partially leached with respect to that metal (e.g. lead). Thus, the separately leached metal plays no part in the process. Of course, an mp zone may still form part of the unit 10 in this preferred embodiment, but the mineral feed may still be a partially leached feed with respect to one or more metals that are easily leached.

The partially leached mineral in the mp zone is transferred to dm zone 19 having a higher oxidation potential than the mp zone and further leaching takes place. Cupric copper present in the dm zone causes leaching of sulfide minerals (see for example equation 1) to produce, inter alia, cuprous copper, ferrous iron and elemental sulfur. The sulfur precipitates into the mineral slurry and no longer participates in any reaction. The sulfur is subsequently transferred from unit 10 in the sludge 23 and separated as product 24. Thus, the leaching in the dm zone 19 is essentially performed by cupric copper which in turn is reduced to cuprous copper as the mineral is progressively leached.

The electrolyte thus removed from unit 10 as stream 14B contains dissolved copper in essentially the cuprous state, which is a most advantageous state from the point of view of electrowinning of the copper. That is, in many electrolysis processes copper is electroplated from the cupric state. When copper is electrowon from the monovalent state, only approximately half the power is required compared to electrowinning from the divalent state. Furthermore, when the cuprous containing electrolyte is highly pure, a far greater cathode current density may be applied in the electrolysis cell and copper electrowinning can be further increased. The copper process is described in greater detail below.

The partially leached mineral is then transferred to the aeration zone 18 for further leaching. Oxygen in the form of air is introduced in the aeration zone stream 22, typically through an axial flow aeration impeller as described below. Air oxidation of the electrolyte oxidises the cuprous form of copper to its cupric form (see equation (11)). Aeration also maintains a stable electrolyte pH. More importantly, aeration brings about the precipitation of leached iron (typically in the form of ferric ion). The chemistry is shown sub-equations (11), (12) and (13), which combine to produce equation (14). Thus, FeOOH (akaganeite) is precipitated into the mineral sludge (and ultimately passes out of the unit 10 in sludge line 23).

When the mineral fed to the process includes chalcopyrite, leaching in the aeration zone can be best understood by referring to equation (15).

The oxidation leached mineral is then transferred from the aeration zone to the hcl zone 17. Any remaining unleached mineral is substantially leached in the hcl zone which has a very high oxidation potential. The halex formed at the anodes of the cells 32 and 42 of the first loop, and the copper electrolysis cell 52 (of the second loop) enters with the electrolyte return flow 14R to the hcl zone. The halex compounds invoke the leaching of difficult to leach mineral sulfides (see e.g. equation (17)) and also difficult to leach gold (see e.g. equation (18)). Halex also reacts with cuprous ion to produce cupric ion, which causes further leach oxidation of the mineral, (see equation (15)).

In the copper electrolytic cell, cupric copper may also be produced at the anode from any cuprous copper in the anode compartment. The cupric copper is recirculated back to the hcl zone to further assist in leaching of mineral therein. The gold leached in hcl zone 17 is recovered in a gold recovery unit 50 by transferring a portion 14P to the gold recovery unit.

Thus it can now be seen how ionic copper in the unit 10 undergoes a number of transitions from being essentially cupric in hcl zone 17, to essentially cuprous in dm zone 19 and to being essentially precipitated in mp zone 20.

Gold Recovery Process

The leached gold containing electrolyte portion 14P is circulated to the gold recovery unit 50 which includes an activated carbon bed. A stream of spent catholyte 54 from the cathode compartment 33 of cell 52 is passed to the recovery unit for contacting with the electrolyte 14P. The spent catholyte has a low oxidation potential, and when contacting the electrolyte reduces the Eh of the solution to below +600 mV (Ag/AgCl) causing the gold to come out of solution as elemental gold and adsorb onto the surface of the activated carbon. The carbon/gold product is separated from the unit 50 before recovery to produce gold as stream 56. The gold depleted electrolyte portion 14P is then returned to the hcl zone.

Figure 5:
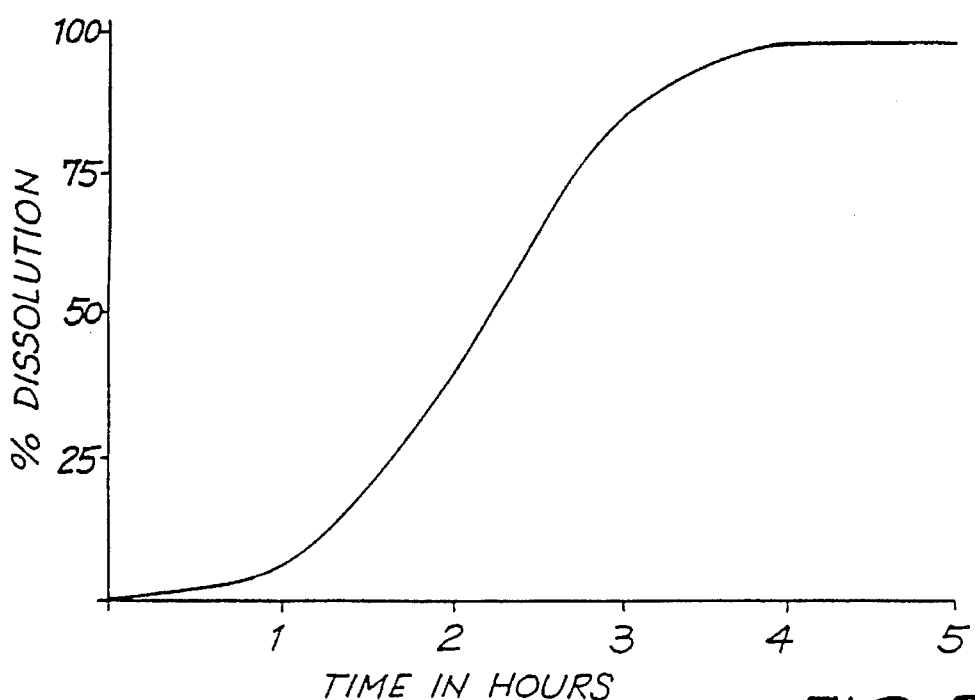
FIG. 5 shows a figure indicating the percentage dissolution of gold granules in a halogen complex containing electrolyte over time.

Because the gold has been leached into the solution as an ionic form, it can be very simply reclaimed, without the need for cyanide leaching and all the attendant problems of that process. The process provides a very efficient, effective and economic means for obtaining gold. FIG. 5 shows the leaching of gold by anodically generated halex species. The gold can be completely leached from a mineral in a short time adding to the effectiveness of the process.

Copper Recovery Process

Figure 2:
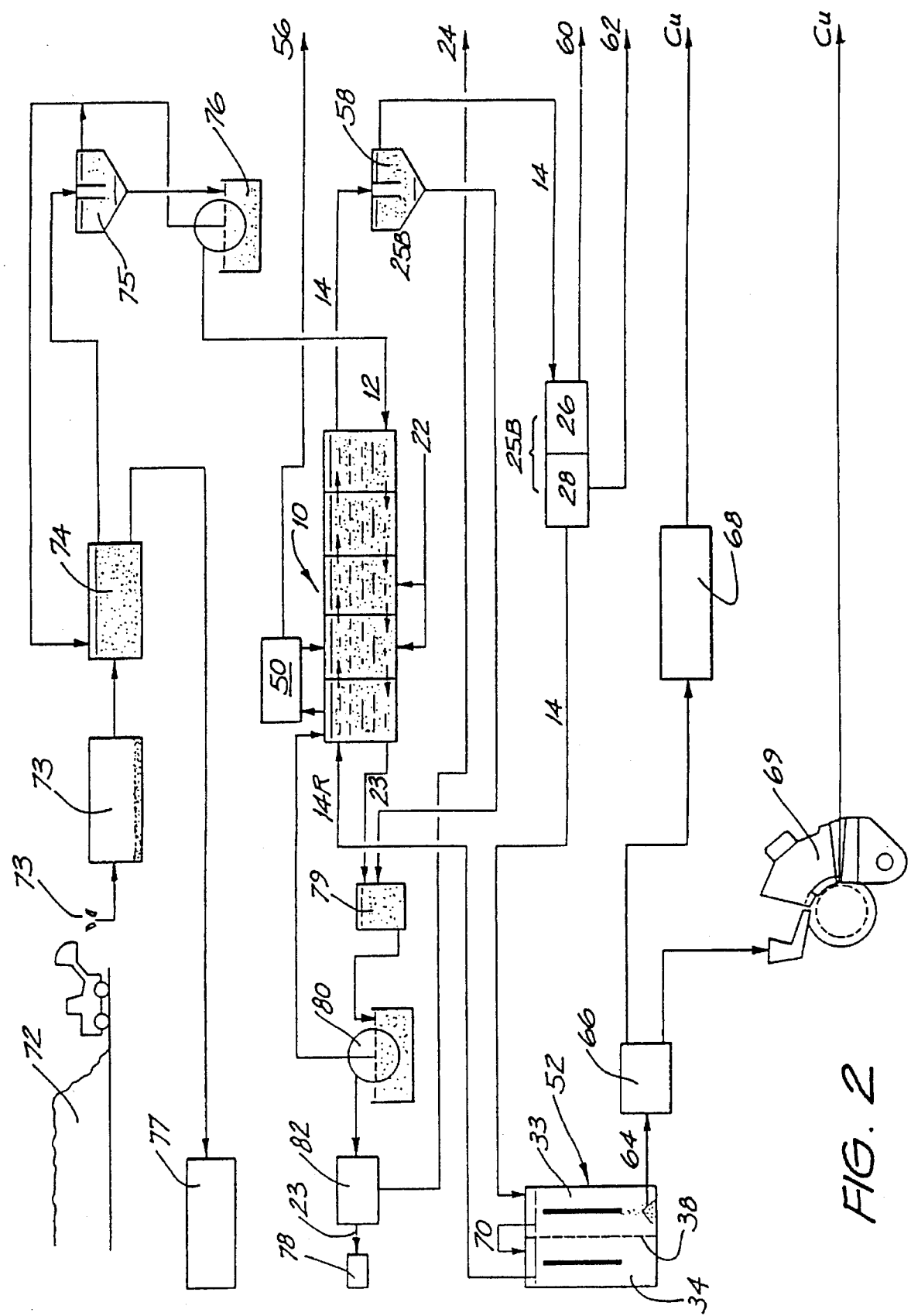
FIG. 2 depicts schematically, a process for producing one or more metals with specific reference to copper.

Referring to FIGS. 1 and 2, (where like reference numerals have been incorporated for like process units in each figure), and firstly to FIG. 1, copper is produced in metal recovery loop 2, by removing a stream of electrolyte 14B from the dm zone 19, treating this in treatment unit 25B and then electrowinning copper in copper electrolysis cell 52, before returning the electrolyte to the contacting unit 10.

The copper in stream 14B is essentially in the cuprous state and therefore the electrowinning requires far less power (approximately half that of electro-winning copper from the cupric ionic state). Treatment unit 25B removes particulate solids in the electrolyte (e.g. in thickener 58) to form part of the sludge 23 removed from the process. The first stage treatment unit 26 removes silver, and when present, mercury as stream 60, and the second stage treatment unit removes any remaining metals which could subsequently contaminate or affect the purity of copper produced in the electrolysis process. The remaining metals are removed as stream 62, and in the production of copper, may include Pb, Zn, As, Sb, Ni, Fe, Co, etc. These removed metals can then be recovered in conventional recovery processes.

After treatment the electrolyte is transferred to electrolysis cell 52 for electrowinning. The essentially cuprous copper containing electrolyte is reduced in cathode compartment 33 to produce copper which is removed as copper stream 64. The particulate copper is filtered, washed and dried in unit 66 and then may be briquetted in briquetting apparatus 68, or formed into wire in Conform machine 69.

Catholyte from the cathode compartment 33 is transferred to the anode compartment 34 as a catholyte stream 70. This is because the membrane 38 does not permit the flow of electrolyte between the anode and cathode compartments, but only the flow of current. (The membrane is described in greater detail below). In the anode compartment, any cuprous copper in the catholyte stream 70 transferred to the anode compartment is oxidised to cupric copper and halex is also formed. The resultant anolyte is then returned as electrolyte return stream 14R to the unit 10.

Typically an electrolyte containing 80 gpl of cuprous copper is fed to cell 52 and is electrolysed such that 50 gpl of copper is formed at the cathode, with 30 gpl of cuprous copper transferring to the anode compartment in stream 70. In general most of this 30 gpl of cuprous copper is oxidised to cupric copper. Thus the return electrolyte, including halex, contains substantially cupric copper and thereby has a high oxidation potential for the leaching of mineral in the hcl zone.

In the process shown in FIG. 2, five leaching tanks in series are shown as defining unit 10. Moving from left to right, typically the first tank would comprise the hcl zone, either or both of the next two tanks could comprise the aeration zone into which air 22 is fed, with the fourth and fifth tanks forming a lower oxidation potential zone, typically the dissolved metal zone 19. However, it should be understood that many variations of this configuration are possible.

Referring in general to FIG. 2, the mineral often comes from a mining source whereby it is crushed and ground 73, and concentrated by flotation 74, with thickening 75 and filtration 76 occurring prior to being fed to unit 10. Tailings from the filtration are taken off at 77 as are sludge 23 tailings 78. The sludge 23 from thickener 58 and from the leaching process 10 is surged in surge tank 79, filtered in filter 80 and passed through sulfur recovery unit 82 for the separation of sulfur from the sludge to produce sulfur stream 24.

Stage One Treatment

The first stage purification may be performed in any or all of treatment units 25A, 25B and 40, and is shown as unit 26 in FIG. 2. The first stage purification is detailed specifically in example 5, and involves the low current density electrowinning on a high surface area cathode, preferably of titanium, with the addition of ionic mercury. A Cu/Hg/Ag amalgam forms on the cathode and is detached in the same manner as in the electrolysis cells 32, 42 and 52. The amalgam may be dissolved in a return anolyte stream from the copper electrolysis cell which breaks down the amalgam into cupric and mercuric ions which are recycled to the first treatment stage.

Dilution of the subsequent return anolyte solution precipitates silver chloride which may then be thermally treated to produce silver metal. Typically the first stage treatment also includes a copper contacting step wherein electrolyte is first passed over elemental copper to cement silver thereon and reduce silver to a content of 15 ppm in the electrolyte, prior to passing it to the silver recovery cell.

The cell is usually stirred by an impeller and includes a copper anode surrounded by a cylindrical titanium mesh cathode. The copper anode may also be formed by granular or briquetted copper in a titanium basket. With the first stage treatment, it is possible to remove practically all of the silver in solution to a high level of purity and at the same time, produce relatively easily a silver product.

Stage Two Treatment

The stage two treatment process 28 may be employed in any or all of treatment units 25A, 25B and 40. The stage two treatment process receives electrolyte from the first stage treatment and is, in essence, a pH raising/separation treatment. The pH of the electrolyte is increased from a level of below 3.5, typically up to a pH of 6 to 6.5. However, the upper level of the pH is monitored so that cuprous copper in solution is not precipitated. (In high chloride solutions, cuprous copper is stable in solution up to a pH of approximately 6.5 to 6.7; see equation (3)).

The pH is preferably raised by adding sodium carbonate $Na_2CO_3$ and optionally, a source of ferrous ion. Arsenic and iron come out at approximately pH 4 to 5 as $FeAsO_4$, zinc as $ZnCO_3$ at a pH of approximately 5.5 and metals such as bismuth, lead and antimony at a pH of 5.5 to 6, as $BiOCl$, $PbO$ and $Sb_2O_3$. The electrolyte is separated from the precipitated salts, which are removed as stream 62. The electrolyte is then ready for copper electrowinning in cell 52.

With previous processes, it is conventional to electrowin copper from a typical copper sulfate solution using a cathode current density of in the region of 250 A/m². Conventional processes typically produce a copper of 99.99% purity. However, with the treatment stages 1 and 2 of the present process, together with the unique leaching configuration of unit 10, it is possible to electrowin copper from a cuprous solution of high purity (to produce a copper purity level of 99.999%). Because of the high purity of the electrolyte, the cathode current density can be increased to 1000 A/m², i.e. four times the conventional cathode current density. This coupled with the electrowinning from a cuprous solution can result in an eight times increase in copper production over the conventional techniques. This is a marked departure from the previous copper processes.

Cathode for Use in Electrolysis Cells

A special cathode may be employed in the electrolysis cells 32, 42 and 52, however this cathode finds broader application beyond these cells. Typically, the cathode is formed from a copper sheet having a plurality of sites for metal formation thereon. Each site is isolated from all other sites by providing an insulating substance between it and all the other sites. Typically the sites are produced by forming a copper sheet with a plurality of dimples thereon.

The insulation is arranged between the dimples and may be formed from a suitable insulating means such as butyl rubber. The butyl rubber prevents the formation of any metal between the dimples, and the metal therefore tends to grow out from the dimple in a dendritic like manner. The metal may be easily wiped off the sheet by running one or more wiper blades over the sheet surface, specifically over the dimples, with the metal dropping out in the bottom of the cell for collection and removal.

Membrane

The electrolysis cells 32, 42 and 52 may employ a special membrane, however, the membrane can find use in cells other than these cells. In use, the membrane is typically attached around an anode of a cell on a supporting frame, for example, a fibreglass frame. The membrane is typically formed by fastening (eg painting) $Na_2SiO_3$ compound onto a supporting substrate (typically a glass cloth supporting substrate).

In use, the membrane forms a $Na_2SiO_3$ derived gel, which functions extremely effectively in the transfer of current between the anode and cathode compartments, and is non-porous. The membrane is also considerably cheaper to produce than existing membranes, for example, the Nafion™ Membrane to Du Pont.

Impeller

Figure 3:
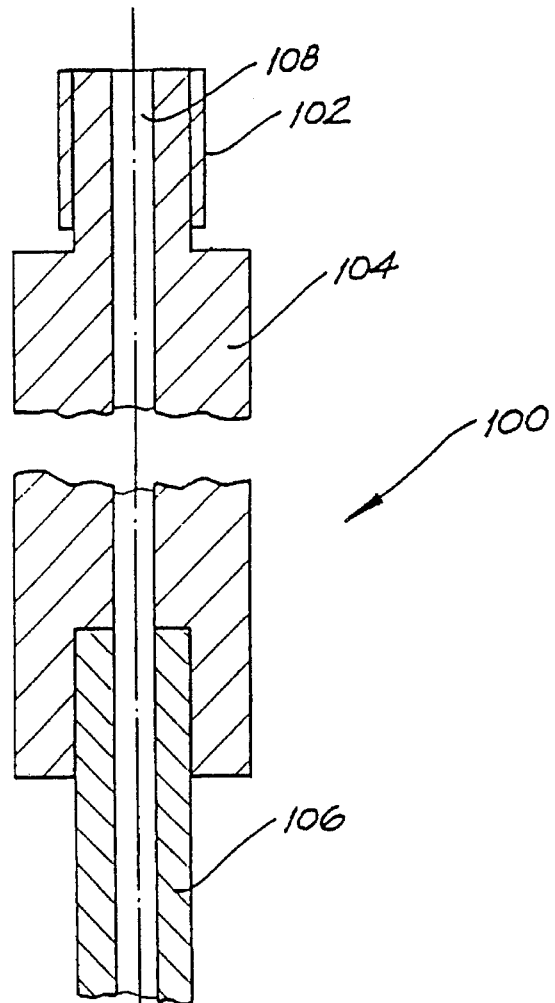
FIG. 3 shows a sectional elevation of an impeller for use with the invention.
Figure 3:
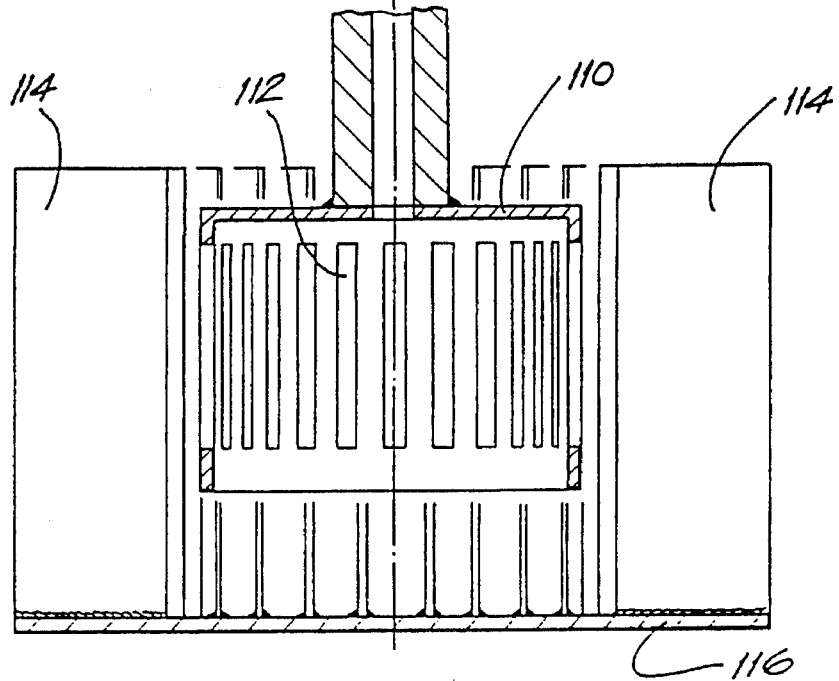

The aeration zone of the unit 10 can employ an impeller as shown in FIG. 3. However, the impeller is not limited to such use.

Referring to FIG. 3, an impeller 100 includes a first end 102 adapted for attachment to a motor drive, with a coupling portion 104 comprising the shaft of the impeller.

The coupling 104 is adapted for receiving an end member 106 having the impeller blades disposed at the free end thereof. An axial bore 108 runs right through the impeller to the air distribution cylinder 110, for feeding air from a separate source through the shaft of the impeller and into a hollow chamber in the cylinder. A plurality of longitudinal slots 112 are formed around the periphery of the cylinder, for releasing air from the chamber. The slots release air in between a plurality of blades 114, typically equally spaced around the periphery of the cylinder 110. The blades are mounted to the cylinder 110 and also to a circular plate 116 defining the base or end of the impeller.

The configuration of the impeller enables air to be forced into mineral slurry passing through the aeration zone such that mineral particles have air adsorbed onto the surface thereof causing a rapid oxidation leaching of the mineral.

Considerable advantages stem from the above described process of the present invention, including the production of high purity metal(s) in an economic, convenient and low polluting manner.

Capital and operating costs are also greatly reduced by the simple and effective process operating parameters (i.e. low temperatures and pressures) with attendant low power and high yield benefits also resulting.

Equations $$CuFeS_2 + 3Cu^{++} \rightarrow 4Cu^+ + Fe^{++} + 2S^o \tag{1}$$

$$Cu^{++} + Fe^{++} \rightarrow Cu^+ + Fe^{+++} \tag{2}$$

$$Cu^+ + 3Cl^- \rightarrow CuCl_3^= \tag{3}$$

$$Cu^{++} + Cl^- \rightarrow CuCl^+ \tag{4}$$

$$CuFeS_2 + \tfrac{3}{4}O_2 + \tfrac{1}{2}H_2O \rightarrow FeOOH + CuS + S^o \tag{5}$$

$$CuS + CuCl^+ + 5Cl^- \rightarrow 2CuCl_3^= + S^o \tag{6}$$

$$CuCl_3^= \rightarrow CuCl^+ + 2Cl^- + e^- \tag{7}$$

$$CuFeS_2 + 2Cu^+ \rightarrow CuS + Cu_2S + Fe^{++} \tag{8}$$

$$PbS + 2Cu^+ \rightarrow Cu_2S + Pb^{++} \tag{9}$$

$$FeS + 2Cu^+ \rightarrow Cu_2S + Fe^+ \tag{10}$$

$$2Cu^+ + \tfrac{1}{2}O_2 + 2H^+ \rightarrow 2Cu^{2+} + H_2O \tag{11}$$

$$Fe^{3+} + 2H_2O \rightarrow FeOOH + 3H^+ \tag{12}$$

$$Fe^{2+} + 2Cu^+ + \tfrac{3}{4}O_2 + \tfrac{1}{2}H_2O \rightarrow FeOOH + 2Cu^{2+} \tag{13}$$

$$CuFeS_2 + CU^{2+} + \tfrac{3}{4}O_2 + \tfrac{1}{2}H_2O \rightarrow 2CU^+ + FeOOH + 2\ S^o \tag{14}$$

$$BrCl_2^- + 2Cu^+ \rightarrow Br^- + 2Cu^{++} + 2Cl^- \tag{15}$$

$$Br^- + 2Cl^- \rightarrow BrCl_2^- + 2e^- \tag{16}$$

$$3BrCl_2^- + 2CuFeS_2 \rightarrow 2Cu^+ + 2Fe^{++} + 3Br^- + 6Cl^- + 4S^o \tag{17}$$

$$3BrCl_2^- + 2Au^o \rightarrow 2Au^{3+} + 3Br^- + 6Cl^- \tag{18}$$

The following non-limiting examples illustrate the operation of various aspects of the process.

EXAMPLE 1

This example demonstrates the removal of soluble copper from the process electrolyte in the mp zone 20 of the unit 10, by an exchange reaction with lead in galena and iron in pyrrhotite, according to the following equations:

$$2Cu^+ + PbS \rightarrow Cu_2S + Pb^{++} \tag{9}$$

$$2Cu^+ + FeS \rightarrow Cu_2S + Fe^{++} \tag{10}$$

Five kilograms of chalcopyrite concentrate was agitated with 10 liters of electrolyte containing 280 gpl NaCl, 28 gpl NaBr and 32.4 gpl of ionic copper in the cuprous form at a pH of 2.7. The temperature was maintained at 85° C. over a 60 minute period.

| RESULTS | | | |
|---|---|---|---|
| | SOLUTION ANALYSES (G.P.L.) | | |
| TIME (MINS.) | Cu | Pb | Fe |
| 0 | 32.4 | 0 | 0 |
| 10 | 16.0 | 9.2 | 0.8 |
| 20 | 11.2 | 15.2 | 5.2 |
| 30 | 8.0 | 15.6 | 6.0 |
| 40 | 5.6 | 16.4 | 7.2 |
| 60 | 0.4 | 18.4 | 8.0 |
| SOLIDS ANALYSES (%) | Cu | Fe | Pb |
| Copper Concentrate | 30.3 | 28.6 | 3.6 |
| Residue after Reaction | 35.4 | 25.0 | 0.4 |

Ninety nine percent of the copper was precipitated from solution in 60 minutes with 91% of the lead and 13% of the iron coming into solution.

EXAMPLE 2

This example demonstrates the reduction of soluble copper in the process electrolyte from the cupric to the cuprous state in the dm zone 19 according to the following equation:

$$3Cu^{2+} + CuFeS_2 \rightarrow 4Cu^+ + Fe^{++} + 2S^o \quad (1)$$

In the dm zone of the unit 10, the electrolyte from the aeration zone is contacted with copper concentrate from the mp zone. The residue from Example 1 (2.2 kg) was agitated with 10 liters of electrolyte containing 280 gpl NaCl, 28 gpl NaBr, 71 gpl cuprous copper and 7 gpl cupric copper at pH 2.6. The temperature was maintained at 85° C. over a three hour period.

RESULTS

| TIME (MINS.) | SOLUTION ANALYSES (G.P.L.) | | |
|---|---|---|---|
| | $Cu^+$ | $Pb^{++}$ | Fe |
| 0 | 71.1 | 7.0 | 0.2 |
| 0.5 | 73.8 | 5.0 | 0.8 |
| 1.0 | 76.6 | 2.9 | 1.4 |
| 2.0 | 78.1 | 1.8 | 1.7 |
| 3.0 | 79.7 | 0.9 | 2.2 |

The cupric copper was reduced from 10% to 1% over three hours.

EXAMPLE 3

This example demonstrates the combined air and cupric copper oxidation of chalcopyrite in the aeration zone of the leaching operation, according to:

$$CuFeS_2 + Cu^{2+} + \tfrac{3}{4}O_2 + \tfrac{1}{2}H_2O \rightarrow 2Cu^+ + FeOOH + 2\,S^o \quad (13)$$

The residue from Example 2 (1.4 kg) was agitated with 14 liters of electrolyte containing 280 gpl NaCl, 28 gpl NaBr and 31.1 gpl total soluble copper with 0.8 gpl in the cupric form.

The leach tank was fitted with a filter 'sock' to allow the removal of clear liquor, which was pumped through the anode chamber of a small electrolyte cell and then returned to the leach slurry. DC power was supplied to the cell to oxidise cuprous in the leach liquor to cupric. During this time, air was injected into the slurry through a 'flotation type' impeller to maintain a stable pH in the range 2–3 until the cupric-cuprous ratio reached approximately 80%.

RESULTS

| TIME (HRS.) | SOLUTION ANALYSES (G.P.L.) | | | |
|---|---|---|---|---|
| | $Cu^{Total}$ | $Cu^{++}$ | Fe | pH |
| 0 | 30.0 | 2.8 | 0 | 2.0 |
| 3 | 38.5 | 8.7 | 1.1 | 2.4 |
| 6 | 55.9 | 14.7 | 0 | 2.8 |
| 9 | 59.7 | 19.0 | 0 | 2.8 |
| 12 | 62.0 | 32.7 | 0 | 2.8 |
| 15 | 62.0 | 51.2 | 0 | 2.0 |

| SOLIDS ANALYSES (%) | Cu | Fe |
|---|---|---|
| Leach Residue-dm zone | 31.5 | 24.4 |
| Leach Residue-aeration zone | 1.7 | 28.4 |

In excess of 95% of the copper was leached with a maximum electrolyte iron content of 1.1 gpl, with the increase in cupric copper proportion from 9–83% of the total copper content.

EXAMPLE 4

This example demonstrates halex leaching of residual copper in the hcl zone and the leaching of gold according to equations (17) and (18).

The apparatus of Example 3 was altered by the replacement of the 'flotation type' impeller for an axial flow impeller and the sealing of the leach vessel. Clear liquor was again pumped through the anode chamber of a small electrolyte cell to convert the residual cuprous copper to the cupric form. At this point the oxidation reduction potential (ORP) of the electrolyte was approximately +450 (Ag/AgCl Standard electrode).

With no residual cuprous copper in the electrolyte, halex was generated at the anode and the ORP of the electrolyte rose steeply. FIG. 4 shows the relationship between electrical energy stored in the electrolyte and the ORP. The D.C. power was maintained till the ORP stabilises at approximately +700 mV (Ag/AgCl) ensuring high leaching of copper and gold.

RESULTS

| TIME (HRS.) | SOLUTION ANALYSES (G.P.L.) | | | | | |
|---|---|---|---|---|---|---|
| | $Cu^{Total}$ | $Cu^{++}$ | Fe | Au (ppm) | pH | ORP (Ag/AgCl) |
| 0 | 62.0 | 51.2 | 0 | 0 | 2.0 | 400 |
| 2 | 62.0 | 57.8 | 0.2 | 0 | 1.8 | 420 |
| 4 | 62.0 | 62.0 | 1.9 | 0 | 1.3 | 450 |
| 6 | 62.0 | 62.0 | 2.4 | 1.5 | 0.8 | 700 |

| SOLIDS ANALYSES (%) | Cu | Fe | Ag | Au (ppm) |
|---|---|---|---|---|
| Leach Residue-Stage 3 | 1.7 | 28.4 | <1 | 15.5 |
| Leach Residue-Stage 4 | 0.36 | 23.0 | <1 | 0.45 |

The overall copper leaching is 99% with 98% of the gold leached in the hcl zone.

EXAMPLE 5

This example demonstrates a treatment process for the removal of soluble silver from pregnant electrolyte, (Stage 1 treatment).

Stage 1 treatment involves low current density electrowinning on a high surface area titanium cathode with the addition of ionic mercury. The Cu/Hg/Ag amalgam detached from the cathode in the same manner as the copper product. The cell utilised solid copper anodes, which in practice can be copper briquettes in a titanium basket.

The amalgam was dissolved in return anolyte to form cuptic and mercuric ions which are both soluble in water. Dilution of the electrolyte resulted in precipitation of silver chloride which was thermally treated to produce silver metal. Cupric, mercuric and any remaining silver ions were recycled to the silver recovery cell. In the event of mercury build up in the system due to the presence of mercury in the feed, precipitation on copper metal from a bleed stream was utilised.

40 liters of a pregnant electrolyte containing 81–1 gpl copper in the cuprous form and 15 ppm silver were agitated in the cell at 85° C. with a 10 amp. D.C. current supplied. The cathode had a surface area of 0.25 m² operating at a current density of 40 A/m². A 10 gpl mercury solution was metered into the cell at 4 mls/minute.

RESULTS

SOLUTION ANALYSES

| TIME (HRS.) | Ag (ppm) | Cu (gpl) | Hg (ppm) |
|---|---|---|---|
| 0 | 15 | 81.1 | — |
| 1 | 6 | 80.5 | — |
| 2 | 2 | 79.9 | — |
| 3 | 0.8 | 79.4 | — |
| 4 | 0.3 | 78.8 | — |
| 5 | 0.17 | 78.2 | <0.2 |

The test was terminated at a silver level of 0.17 ppm after five hours. The theoretical silver level to produce copper to L.M.E. Grade A specification (25 ppm Ag) is 1.25ppm. However, by removing silver to <0.2ppm, copper of 99.999% purity can potentially be produced.

The residual soluble mercury at the completion of the test was <0.2 ppm in the electrolyte.

EXAMPLE 6

This example demonstrates a treatment process for the removal of contaminant metal ions, other than silver and mercury, (Stage 2 treatment).

Stage 2 treatment is based on the high stability of cuprous copper up to pH of 6 approximately. The liquor from stage one contains near zero cupric copper after silver removal. This is important, as cupric is unstable above pH 2.8–3.0, forming an insoluble oxychloride compound. The pH of the liquor is raised by the addition of sodium carbonate, to a pH of 6.0, precipitating contaminants as a complex mixture of oxides and carbonates, which settle and filter readily.

The 40 liters of electrolyte from Example 5 were purified at 85° C. by the addition of sodium carbonate as a 40% w/v solution. Dry sodium carbonate would be used for larger scale operating plants.

RESULTS

| TIME (MINS.) | SOLUTION ANALYSES (G.P.L.) | | | | | |
|---|---|---|---|---|---|---|
| | Cu | Pb | Zn | Fe | As (ppm) | pH |
| 0 | 78.2 | 3.2 | 4.1 | 1.7 | 56.4 | 2.47 |
| 30 | 78.2 | 3.0 | 4.1 | 1.3 | 43.1 | 4.91 |
| 60 | 78.2 | 2.8 | 3.6 | 0.52 | 17.2 | 5.05 |
| 90 | 78.2 | 2.6 | 3.6 | 0.14 | 4.6 | 5.23 |
| 120 | 78.2 | 2.5 | 3.4 | 0.02 | 0.66 | 5.82 |
| 140 | 78.2 | 2.4 | 3.2 | 5 ppm | <1 ppm | 5.92 |
| 160 | 76.2 | 2.4 | 3.2 | 5 ppm | <1 ppm | 6.21 |

Iron, zinc and lead precipitated concurrently. The pH remained constant at a value of 5 while the majority of the iron precipitated and then continued to rise until copper began to precipitate at pH 6.0–6.2. Alkali addition was stopped at pH 5.9, prior to copper loss, but the slow rate of reaction of residual soluble alkali forced the pH up to 6.2 with the loss of 2 gpl copper. This highlighted the need for good pH control at this stage.

Lead and zinc stabilised at 2.4 and 3.2 gpl respectively, but did not contaminate the copper product at these levels.

Iron and arsenic were reduced to 5 ppm and <1 ppm respectively. Antimony and bismuth were not monitored during the test but were analysed in the purified electrolyte at <1 ppm and <2 ppm respectively.

Whilst the invention has been described with reference to a number of preferred embodiments, it should be appreciated that the invention can be embodied in many other forms.

I claim:

1. A process for producing one or more metals from a mineral containing the same, wherein the mineral is transferred to a leaching process comprising a high oxidation potential zone (hop zone) and a low oxidation potential zone (lop zone) and through which an electrolyte of acid pH is passed from the hop zone to the lop zone, comprising the steps of:

(i) feeding the mineral to the lop zone to contact the electrolyte whereby at least some of the or each metal is leached from the mineral, with at least some of the or each metal that is leached being in a low oxidation valence state;

(ii) electrolysing the electrolyte that leaves the lop zone in an electrolysis process to produce the one or more metals and to increase the oxidation potential of the electrolyte that leaves the electrolysis process;

(iii) returning the electrolyte of increased oxidation potential to the hop zone of the leaching process; and (iv) reducing the oxidation potential of the electrolyte as it is passed through the hop zone to the lop zone to its level prior to electrolysis; wherein the oxidation potential of the electrolyte is reduced by continuous countercurrent contact of the electrolyte with the mineral as the electrolyte is passed through the hop zone to the lop zone and as the mineral is passed from the lop zone to the hop zone.

2. A process as claimed in claim 1 wherein the oxidisable substance is the mineral and the electrolyte is in continuous contact with the mineral as the mineral is passed from the lop zone to the hop zone to substantially leach the or each metal from the mineral.

3. A process as claimed in claim 2 wherein the electrolyte includes two or more halides, and the increase in oxidation potential of the electrolyte is brought about by forming one or more halide complexes which cause further leaching of the one or more metals from the mineral as it passes through the hop zone.

4. A process as claimed in claim 3 wherein the electrolyte includes dissolved copper in the hop zone and the hop zone comprises a halide complex leaching zone (hcl zone) into which electrolyte returning from the electrolysis process is passed and in which final leaching of the mineral takes place before it is removed from the leaching process, and an aeration zone through which electrolyte from the hcl zone is passed and aerated and through which partially leached mineral from the lop zone is passed for further leaching before transfer to the hcl zone, the aeration precipitating leached iron when present in the mineral and/or oxidising at least some of any cuprous copper present in the aeration zone to cupric copper.

5. A process as claimed in claim 4 wherein the electrolyte returned to the hop zone is at an oxidation potential (Eh) of greater than 600 mv with reference to an Ag/AgCl standard electrode.

6. A process as claimed in claim 5 wherein the electrolyte leaches any gold present in the mineral fed to the leaching process and wherein a portion of the electrolyte in the hop zone is removed and passed to a gold recovery process comprising the steps of:

passing the electrolyte portion to an activated carbon bed;

contacting the electrolyte portion with a low oxidation potential solution to reduce the Eh to below +600 mV with reference to the Ag/AgCl standard electrode, to cause the gold to come out of solution and absorb on the activated carbon;

separating the carbon with gold absorbed thereon from the electrolyte portion as a carbon/gold product;

returning the gold depleted electrolyte portion to the hop zone; and recovering gold from the carbon/gold product.

7. A process as claimed in claim 6 wherein the low oxidation potential solution is spent catholyte from the electrolysis process.

8. A process as claimed claim 2 wherein the electrolyte includes chloride and dissolved copper which is substantially in the cupric state as the electrolyte enters the hop zone and is substantially in the cuprous state as the electrolyte leaves the lop zone.

9. A process as claimed in claim 8 wherein the mineral fed to the leaching process includes copper in a sulfide form such that transfer of the mineral through the leaching process precipitates elemental sulfur which is then removed with leached mineral leaving the leaching process.

10. A process as claimed in claim 9 wherein the lop zone comprises a dissolved copper zone (dc zone) wherein at least a portion of the copper is in a solubilised form, and a copper precipitation zone (cp zone) wherein at least a portion of any dissolved copper in the electrolyte is precipitated therefrom to mix with any mineral that has been fed to the leaching process in the cp zone to form a mixture, the mixture then being countercurrently transferred through the leaching process, with electrolyte from the hop zone passing firstly through the dc zone and then through the cp zone and with mineral being fed to the leaching process to either or both of the dc and cp zones.

11. A process as claimed in claim 10 wherein the electrolysis process includes producing copper in at least one copper electrolysis cell so that the electrolyte that passes to the copper electrolysis cell is from the lop zone and so that the electrolyte is from the dc zone.

12. A process as claimed in claim 11 wherein the electrolyte is treated after leaving the lop zone and prior to entering the copper electrolysis cell, the treatment process comprising the steps of:

(ic) substantially removing any impurities in the electrolyte; and/or (id) substantially removing a certain metal or metals which may contaminate copper produced in the copper electrolysis cell.

13. A process as claimed in claim 12 wherein the mineral fed to the leaching process includes one or more of Pb, Zn, As, Sb, Bi, Hg, Ag, Fe as the certain metal or metals, and substantial removal of the certain metal or metals in step (id) includes treating the electrolyte in a treatment process:

(ie) comprising the steps of passing the electrolyte to an electrolysis cell having a cathode and a copper anode;

adding soluble mercury to the electrolyte in the cell;

electrolysing the resultant solution to form a Cu/Hg/Ag amalgam on the cathode, and optionally removing the amalgam and dissolving it in an oxidising solution;

diluting the solution to precipitate silver as silver chloride; and separating the silver chloride from the remaining solution, to remove any Ag and Hg in the electrolyte; or (if) comprising the steps increasing the pH of the electrolyte up to a value ranging from approximately 6 to 6.5 or to a value just prior to cuprous copper precipitation, in stepwise increases of one or more predetermined pH ranges between pH 3.5 and said value, each pH range corresponding to a point at which one or more of the certain metal or metals precipitate from the electrolyte; and removing the precipitate of the one or more certain metal or metals at each pH range from the electrolyte, to substantially remove any remaining certain metal or metals.

14. A process as claimed in claim 13 wherein prior to step (ie) the electrolyte is contacted with copper metal to reduce any cupric copper in solution to cuprous copper and to cause cementation of any silver in the electrolyte on the copper so as to reduce the electrolyte silver content to approximately 15 ppm.

15. A process as claimed in claim 13 wherein the oxidising solution is a portion of return anolyte having at least some cupric copper present therein from, when present, a copper electrolysis cell in the process.

16. A process as claimed in claim 13 wherein in step (ie) any Hg not substantially removed is substantially removed by contacting at least a portion of the electrolyte from step (ie) with copper metal and then returning the so-contacted electrolyte to step (if).

17. A process as claimed in claim 10 wherein copper precipitate transferred through the dc zone and into the hop zone is successively leached therefrom so that mineral leaving the leaching process is substantially free of copper.

18. A process as claimed in claim 1 wherein the electrolyte is treated after leaving the lop zone and prior to entering the electrolysis process, the treatment process comprising the steps of:

(ia) removing any impurities in the electrolyte; and/or (ib) removing a certain metal or metals which may contaminate the or each metal produced in the electrolysis process.

19. A process as claimed in claim 18 wherein step (ib) includes raising the pH of the electrolyte to a level sufficient to preserve the or each metal in solution, and which causes precipitation of at least some of the certain metals, which precipitates are then separated from the electrolyte.

20. A process as claimed in claim 18, wherein at least one of the impurities is silver and step (ia) is a treatment process for substantially removing silver from a cuprous chloride electrolyte comprising the steps of:

passing the electrolyte to an electrolysis cell having a cathode and a copper anode;

adding soluble mercury to the electrolyte in the cell;

electrolysing the resultant solution to form a Cu/Hg/Ag amalgam on the cathode.

21. A process as claimed in claim 20 comprising the additional steps of:

removing the amalgam and dissolving it in an oxidising solution;

diluting the solution to precipitate silver as silver chloride; and separating the silver chloride from the remaining solution.

22. A process as claimed in claim 20 wherein said electrolysis of the resultant solution employs a low cathode current density.

23. A process as claimed in claim 20 wherein the cathode material is titanium and the copper anode is formed as discrete blocks or granules in a porous titanium basket.

24. A process as claimed in claim 18, wherein the impurities include the certain metal(s) and step (ib) is a treatment process for substantially removing the certain metal or metals from a cuprous chloride electrolyte having a pH of generally less than 3.5 comprising the steps of:

increasing the pH of the electrolyte up to a value ranging from approximately 6 to 6.5 or to a value just prior to cuprous copper precipitation, in stepwise increases of one or more predetermined pH ranges between pH 3.5 and said value, each pH range corresponding to a point at which one or more of the certain metal(s) precipitate from the electrolyte; and removing the precipitate of the one or more certain metal(s) at each pH range from the electrolyte.

25. A process as claimed in claim 24 wherein the metals precipitated include iron, arsenic, antimony, bismuth, lead, zinc, nickel and cupric copper.

26. A process as claimed in claim 24 wherein a soluble ferrous salt may be added to the solution and the pH is increased by adding sodium carbonate $Na_2CO_3$.

27. A process as claimed in claim 1 wherein the electrolysis process includes producing the one or more metals in one or more electrolysis cells, wherein the or each electrolysis cell comprises a membrane, separating a cathode from an anode and wherein the or each metal is produced at the cathode of a given cell, the electrolyte forming catholyte at the cathode side of the cell and the electrolyte forming anolyte at the anode side of the cell, with at least a portion of the catholyte being transferred to the anolyte either directly through or by-passing the membrane, or indirectly via one or more further electrolysis cells.

28. A process as claimed in claim 27 wherein the membrane is non-porous and the catholyte flow by-passes the membrane.

29. A process as claimed in claim 27 wherein the electrolysis process includes a plurality of electrolysis cells in series, with the catholyte and anolyte being in either cocurrent flow or countercurrent flow in the series, and when in countercurrent flow:

at least a portion of the catholyte from a given cell in the series is transferred to a subsequent cell in the series to form at least a portion of the catholyte of that cell, and at least a portion of the anolyte in the subsequent cell is returned to the given cell to form at least a portion of the anolyte in the given cell;

and when in cocurrent flow:

at least a portion of the catholyte from a given cell in the series is transferred to a subsequent cell in the series to form at least a portion of the catholyte of that cell, and at least a portion of the anolyte in the given cell is transferred to form at least a portion of the anolyte of the subsequent cell;

wherein at least a portion of the catholyte for the first cell in the series is the electrolyte from the S lop zone and at least a portion of the electrolyte returned to the hop zone is either the anolyte from the first cell in the series when the catholyte and anolyte are in countercurrent flow or is the anolyte from the final cell when the catholyte and anolyte are in cocurrent flow.

30. A process as claimed in claim 29 wherein when the catholyte and anolyte are in countercurrent flow, at least a portion of the catholyte from the final cell in the series is transferred to form the anolyte of the final cell, and when the catholyte and anolyte are in cocurrent flow, at least a portion of the catholyte from the final cell in the series is transferred to form the anolyte of the first cell.

31. A process as claimed in claim 29 wherein a treatment process is employed for incoming electrolyte to each cell for removing any impurities in the electrolyte and for removing any metal or metals which may contaminate the or each metal produced in the cell.

32. A process as claimed in claim 31 wherein the mineral fed to the leaching process includes Ni, Pb and Zn and one of the cells in the series is for the production of Ni, another cell is for the production of Pb or Pb/Zn and another cell is for the production of Zn.

33. A process as claimed in claim 32 wherein the treatment process prior to the nickel producing cell includes passing the electrolyte through particulate nickel, the treatment process prior to the lead producing cell includes passing the electrolyte through particulate lead and the treatment process prior to the zinc producing cell includes passing the electrolyte through particulate zinc.

34. A process as claimed in claim 27 wherein the treatment process also includes treating the incoming electrolyte in a process comprising the steps of:

passing the electrolyte to an electrolysis cell having a cathode and a copper anode;

adding soluble mercury to the electrolyte in the cell;

electrolysing the resultant solution to form a Cu/Hg/Ag amalgam on the cathode, and optionally removing the amalgam and dissolving it in an oxidising solution;

diluting the solution to precipitate silver as silver chloride; and separating the silver chloride from the remaining solution, to substantially remove any Ag and Hg; or increasing the pH of the electrolyte up to a value ranging from approximately 6 to 6.5 or to a value just prior to cuprous copper precipitation, in stepwise increases of one or more predetermined pH ranges between pH 3.5 and said value, each pH range corresponding to a point at which one or more of the certain metal or metals precipitate from the electrolyte; and removing the precipitate of the one or more certain metal or metals at each pH range from the electrolyte, to substantially remove any remaining metal or metals of said metals which may contaminate the or each metal produced in a given cell.

35. A countercurrent leaching process for leaching one or more metals from a mineral containing the same, the process comprising a high oxidation potential zone (hop zone) and a low oxidation potential zone (lop zone) whereby an electrolyte of high oxidation potential and acid pH is fed to the hop zone and the mineral is fed to the lop zone, comprising the steps of:

(1) passing the electrolyte from the hop zone to the lop zone and transferring the mineral from the lop zone to the hop zone in a counter-current direction to electrolyte flow, the electrolyte being kept in continuous contact with the mineral to leach at least some of the one or more metals therefrom thereby lowering its oxidation potential;

(2) removing the electrolyte from the lop zone with the one or more metals therein and removing a partially or substantially leached mineral from the hop zone;

wherein the electrolyte fed to the hop zone includes one or more halide complexes formed from the combination of two or more halides.

36. A process as claimed in claim 35 wherein the electrolyte includes chloride and dissolved copper which is substantially in the cupric state as the electrolyte enters the hop zone.

37. A process as claimed in claim 36 wherein the hop zone comprises a halide complex leaching zone (hcl zone) into which electrolyte is fed to the process and in which final leaching of the mineral takes place before it is removed from the leaching process, and an aeration zone through which electrolyte from the hcl zone is passed and aerated and through which partially leached mineral from the lop zone is passed for further leaching before transfer to the hcl zone, the aeration precipitating leached iron when present in the mineral and/or oxidising at least some of any cuprous copper present in the aeration zone to cupric copper.

38. A process as claimed in claim 37 wherein the lop zone comprises a dissolved copper zone (dc zone) wherein at least a portion of the copper is in a solubilised form, and a copper precipitation zone (cp zone) wherein at least a portion of dissolved copper in the electrolyte is precipitated therefrom to mix with any mineral that has been fed to the process in the cp zone, with electrolyte from the hop zone passing firstly through the dc zone and then through the cp zone before leaving the process and with mineral being fed to the process to either or both of the dc and cp zones.

39. A process as claimed in claim 38 wherein the mineral fed to the process includes copper in a sulfide form such that transfer of the mineral through the leaching process precipitates elemental sulfur which is then removed with leached mineral leaving the process.

40. A process as claimed in claim 38 wherein the oxidation potential in the dc zone is greater than the oxidation potential in the cp zone.

41. A process as claimed in claim 39 wherein the mineral fed to the process includes sulfur containing ores.

42. A process as claimed in claim 41, wherein copper in the precipitation zone is precipitated as both cupric and cuprous sulfide, with the copper precipitating by cementation on the sulfur containing mineral being fed to the cp zone.

43. A process as claimed in claim 35 wherein the process is operated at generally atmospheric pressure.

44. A process as claimed in claim 35 wherein the electrolyte is a sodium chloride electrolyte having a concentration ranging from 250 to 300 gpl of electrolyte.

45. A process as claimed in claim 44 wherein the pH of the electrolyte is 3.5 or less, and preferably ranges from 0.5 to 3.

46. A process as claimed in claim 45 wherein the temperature of the electrolyte is sufficient to leach the or each metal, and to maintain the or each metal in solution.

47. A process as claimed in claim 46 wherein the temperature of the electrolyte is greater than 60° C. and preferably ranges from 70° C. up to the boiling point of the electrolyte at ambient pressure.

* * * * *